(12) United States Patent
Nakae (10) Patent No.: US 6,520,396 B2
(45) Date of Patent: Feb. 18, 2003

(54) OPTICAL FIBER CUTTING DEVICE

(75) Inventor: Toshihiro Nakae, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/900,025

(22) Filed: Jul. 9, 2001

(65) Prior Publication Data

US 2002/0003158 A1 Jan. 10, 2002

(30) Foreign Application Priority Data

Jul. 7, 2000 (JP) ........................................ 2000-206919
Aug. 21, 2000 (JP) ........................................ 2000-249716

(51) Int. Cl.[7] ............................................. B65H 20/00
(52) U.S. Cl. ..................................................... 225/103
(58) Field of Search ................................ 225/103, 96.5, 225/96

(56) References Cited

U.S. PATENT DOCUMENTS 4,257,546 A * 3/1981 Benasutti ................. 225/96.5
5,108,021 A * 4/1992 Vines ......................... 225/96
5,368,211 A * 11/1994 Michel et al. ............. 225/96.5

FOREIGN PATENT DOCUMENTS

| JP | 4-123009 | 4/1992 |
| JP | 2000-56140 | 2/2000 |

* cited by examiner

Primary Examiner—Douglas D. Watts
(74) Attorney, Agent, or Firm—McDermott, Will & Emery (57) ABSTRACT

An optical fiber cutting device is proposed which can perform cutting of optical fibers on the principle of stress rupture stably under predetermined conditions, and which eliminates damage to the blade or the cut end face due to failure or excessive movement. When a wire of an optical fiber stopped by a ferrule-holding portion is gripped by a chuck of a fiber-holding portion and a lever is pulled in this state, tension corresponding to the amount of relative movement of the lever is applied to the optical fiber. Further, this relative movement is converted to the motion of a cutting blade table by a motion-converting mechanism to control the position of a blade. While no tension is applied to the optical fiber, the fiber-holding portion moves following the movement of the lever.

5 Claims, 9 Drawing Sheets

OPTICAL FIBER CUTTING DEVICE

BACKGROUND OF THE INVENTION

This invention relates to a cutting device for cutting optical fibers on the principle of stress rupture, and particularly a cutting device which can perform cutting of an optical fiber stably under predetermined conditions, thereby preventing the failure of the device and damage to the flaw forming blade or cut end face of the optical fiber due to excessive cutting.

As one method of cutting an optical fiber wire having a core made of glass, there is known a method that utilizes the principle of stress rupture. In this method, with tension applied to the optical fiber to be cut, an initial flaw is formed in the outer periphery of the wire by a flaw forming blade. Then, stress rupture occurs with the flaw as a starting point, so that the wire is cut at a right angle relative to its axis.

As devices for cutting an optical fiber wire on the principle of stress rupture, there are known ones disclosed in Japanese patent publication 4-123009 and U.S. Pat. Nos. 5108021 and 5460311, and one the applicant proposed in Japanese patent publication 2000-561409.

In conventional optical fiber cutting devices disclosed in these publications, if an optical fiber is properly and reliably set in a tension-imparting portion, the flaw forming blade cuts into the wire when the tension applied to the optical fiber reaches a predetermined value.

But in conventional devices, since the flaw forming blade is unconditionally linked to the motion of the tension-imparting portion, the relation between the moving amount of the tension-imparting portion and the magnitude of the tension applied to the optical fiber may vary due to unexpected situations such as poor clamp of the optical fiber, poor setting or trouble of portions or minor mistake of work. Thus, the flaw forming blade may cut into the wire at such a stage that a suitable tension is not applied to the optical fiber. In this case, even though the initial flaw is formed in the wire, stress rupture will not occur at this point of time, so that the blade is pressed against the wire with a stronger force.

If clamp of the optical fiber is insufficient, the flaw forming blade may abut the wire, which is moving by being pulled, and be abraded by the wire. In either cases, troubles in which the cutting edge of the flaw forming blade gets damaged or its cutting function is lost can occur.

Even if cutting is carried out normally under suitable conditions, in case the flaw forming blade does not stop but keep moving after cutting, the flaw forming blade may touch the cut end face of the wire, incurring damage or breakage of the end face.

In order to eliminate such trouble, it is required to reliably form an extremely shallow flaw in the outer periphery of a fine wire having an outer diameter of 0.1–0.3 mm when a suitable tension is applied to the wire, and also stop the flaw forming blade there. But with conventional cutting devices, in which the flaw forming blade is simply linked to the movement of the tension-imparting portion, it is difficult to meet such requirements.

With a method in which the movement of the flaw forming blade is stopped at a suitable position by providing a stopper, it is necessary to stop the blade immediately after a shallow flaw has been formed in the outer periphery of the wire. But since the setting position of the optical fiber delicately varies due to variations in the dimensions of fixed portions, there are cases in which the blade does not reach the wire and cannot form a flaw.

An object of this invention is to obviate these defects and disadvantages.

SUMMARY OF THE INVENTION

According to this invention, there is provided an optical fiber cutting device, comprising a tension imparting mechanism for imparting tension to an optical fiber to be cut, a flaw forming mechanism for forming an initial flaw for stress rupture in the optical fiber to which is applied the tension, the flaw forming mechanism comprising a blade table and a flaw forming blade mounted on the blade table for forming the initial flaw in the optical fiber, and a driving means for actuating the flaw forming mechanism, the flaw forming blade of the flaw forming mechanism being structured to move in proportion to the magnitude of the tension applied to the optical fiber.

This cutting device may be of a type that detects the tension applied to the optical fiber with a sensor and moves the flaw forming blade by means of an actuator by controlling the stroke of the actuator. But the following type is preferable.

In the preferable cutting device, the tension imparting means comprises a ferrule holding portion for holding a ferrule fitted on the optical fiber, a fiber-holding portion slidable in the longitudinal direction of the optical fiber for clamping a wire of the optical fiber protruding from the end face of the ferrule, a first resilient member for biasing the fiber-holding portion in a direction away from the ferrule-holding portion, and a lever coupled to the fiber-holding portion through the first resilient member so as to be movable relative to the fiber-holding portion, the driving means comprising a motion-converting mechanism for converting the relative movement between the fiber-holding portion and the lever to the motion of the blade table according to the amount of the relative movement to control the position of the blade table. Preferably this device may comprise a second resilient member for returning the lever so that the force of the second resilient member is transmitted to the fiber-holding portion through the lever, or the blade table and the blade of the flaw-forming mechanism are moved in the cutting direction by the force of a resilient member.

Since the cutting device of this invention carries out position control of the flaw forming blade according to the tension applied to the optical fiber, the flaw forming blade will not cut while a suitable tension is not applied or while the optical fiber is moving.

Also, since the tension is released when the optical fiber is cut, the movement of the flaw forming blade stops at this time, so that no excessive cutting will occur.

With the device according to the present invention, since relative movement occurs between the fiber-holding portion and the lever only when tension is applied to the optical fiber, and in association with the movement of the lever at that time, the blade table of the flaw-forming mechanism moves, the position of the flaw forming blade is automatically adjusted according to the tension applied to the optical fiber without using e.g. a tension-detecting sensor. Thus it is possible to achieve a simple, small and inexpensive device.

Also with this device, when the optical fiber is cut, the force stopping or holding the fiber-holding portion disappears and the fiber-holding portion is moved in such a direction as to decrease the amount of relative movement relative to the lever by the force of the first resilient member, so that the flaw forming blade is instantly returned from the cutting end point. Thus, it is possible to reliably eliminate the possibility of the end face of wire after cutting being abraded and damaged by the flaw forming blade.

Besides, the device in which a second resilient member for returning the lever or the one in which the blade table and the flaw forming blade are moved by the force of the resilient member is more simple and inexpensive and easier to operate.

Other features and objects of the present invention will become apparent from the following description made with reference to the accompanying drawings, in which:

DETAILED DESCRIPTION OF THE PREFERRED EMBODIMENT

Figure 1:
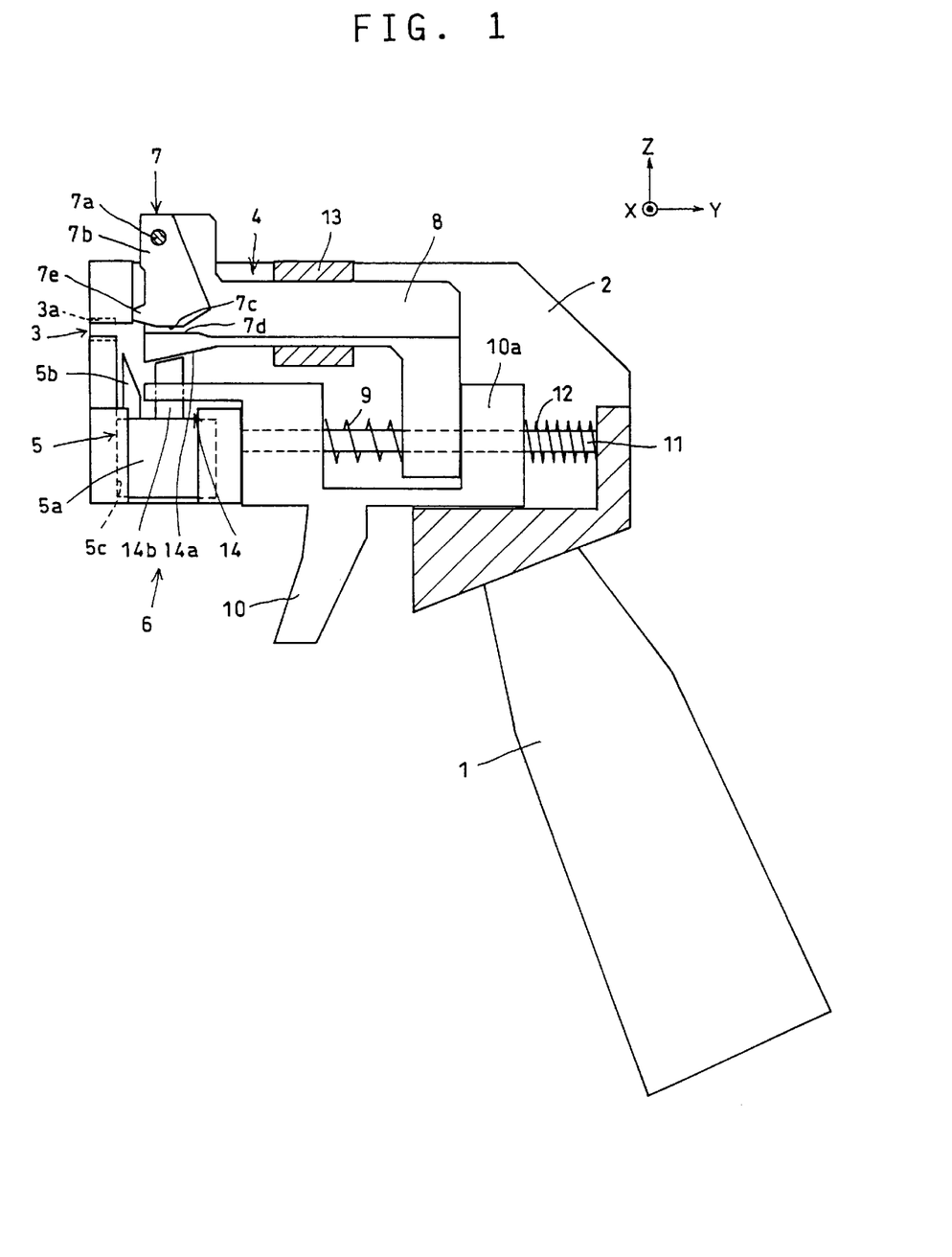
FIG. 1 is a sectional view showing the first embodiment of a cutting device of this invention.
Figure 2:
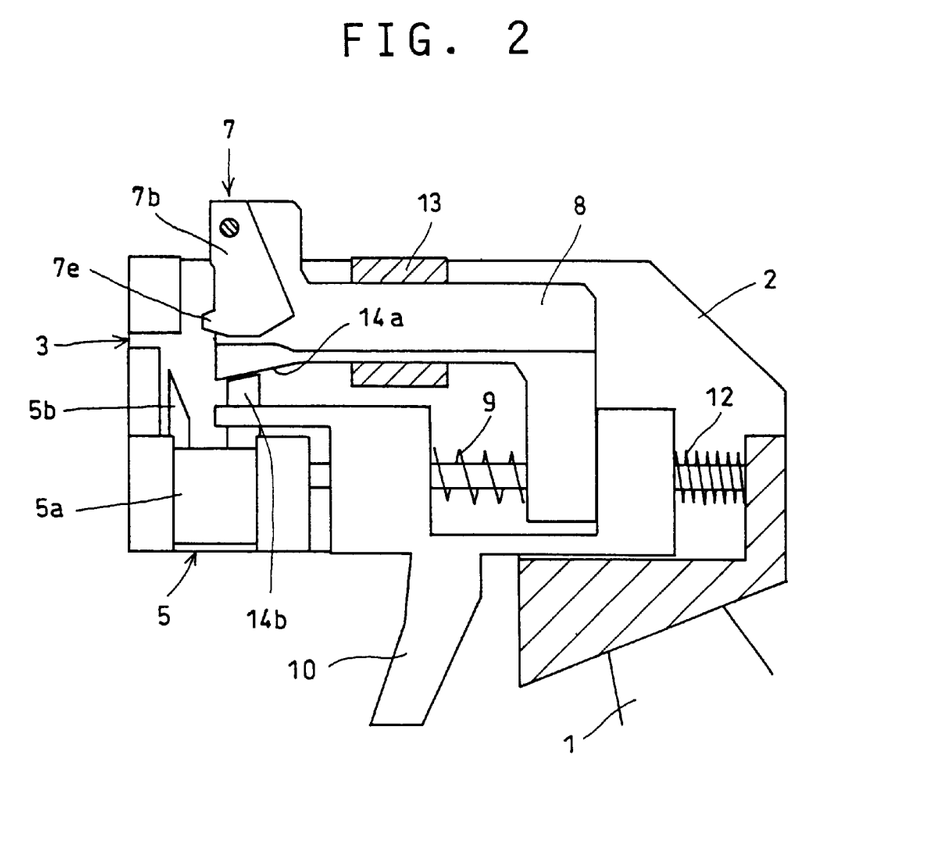
FIG. 2 is a view showing the operation of the device of FIG. 1 when an optical fiber is not set.
Figure 3:
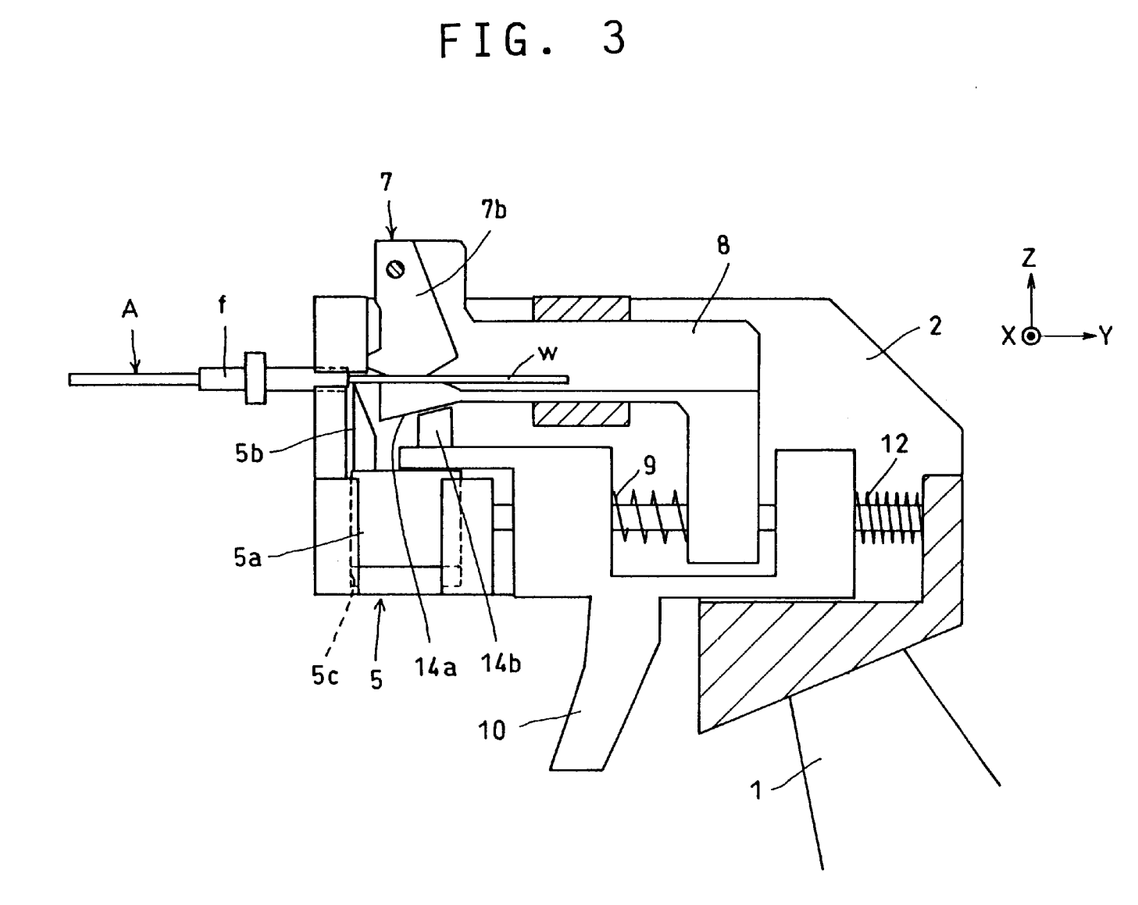
FIG. 3 is a view showing the operation of the same when it is set.

FIGS. 1–3 show a first embodiment of the optical fiber cutting device of this invention. As shown in FIG. 1, it comprises a body frame 2 having a grip 1, a ferrule-holding portion 3 provided at the front end of the body frame 2, a tension-imparting mechanism 4 mounted on the body frame 2, a flaw-forming mechanism 5 for forming an initial flaw in an optical fiber to be cut, and a driving means 6 for actuating a blade table 5a and a flaw forming blade 5b of the flaw-forming mechanism 5.

The ferrule-holding portion 3 has an end plate provided at the front end of the body frame 2 and formed with a stepped ferrule inserting hole 3a in which the tip of a ferrule abuts.

The flaw-forming mechanism 5 comprises the blade table 5a movable in the Z direction, the flaw forming blade 5b mounted on the blade table 5a, and a guide 5c for guiding the blade table 5a.

The tension-imparting mechanism 4 comprises a fiber-holding portion 8 having a chuck 7 at its tip, a tension spring 9 for biasing the fiber holding portion 8 in a direction away from the ferrule retaining portion 3 (direction Y in the figure), a lever 10 coupled to the fiber-holding portion 8 through the tension spring 9 so as to be movable in the Y direction, a guide shaft 11 extending through the lever 10 and the fiber-holding portion 8, and a spring 12 for urging the lever 10 back to its original position.

The fiber-holding portion 8 is supported by a guide 13 provided on the body frame 2 so as to be slidable in the longitudinal direction of the optical fiber (Y direction). The chuck 7 provided at the tip of the fiber-holding portion 8 is provided with a cam type clamp claw 7b pivotable around a support shaft 7a to clamp a wire of an optical fiber between a clamp surface 7c formed on the clamp claw 7b and a clamp surface 7d on the fixed side. The gap between the clamp surfaces 7c and 7d is aligned with the ferrule inserting hole 3a. Thus a wire of an optical fiber that has passed through the ferrule inserting hole 3a is inserted into this gap.

The clamp claw 7b has a protrusion 7e. In the state of FIG. 1 in which the protrusion 7e abuts the wall at the tip of the body frame 2, the clamp claw 7b slightly turns counterclockwise, so that the gap between the clamp surfaces 7c and 7d opens to such a size that a wire of an optical fiber (having an outer diameter of e.g. 0.23 mm) can be inserted.

When the fiber-holding portion 8 moves in the Y direction, the clamp claw 7b will turn clockwise under the force of a spring (not shown), so that the wire is clamped between the clamp surfaces 7c and 7d. In this state, when the fiber-holding portion 8 is moved further in the Y direction, the clamp surface 7c is held back by the wire, so that the force for turning the clamp claw 7b will clockwise increases. The clamp force thus increases.

The lever 10 is provided with a movement-restricting portion 10a for restricting the movement of the fiber-holding portion 8. Through the movement-restricting portion 10a, the force of the return spring 12 is also transmitted to the fiber-holding portion 8. The force of the spring for turning the clamp claw 7b is sufficiently small compared with the force of the return spring 12. Thus, in the state of FIG. 1, the protrusion 7e is pressed against the end wall of the body frame 2 by the force of the return spring 12 and the clamp claw 7b turns counterclockwise, so that the clamp by the clamp claw 7b is reliably released.

The driving means 6 is of a type which moves the blade table 5a in the Z direction under the force of a spring (not shown). The driving means 6 includes a motion-converting mechanism 14 for carrying out position control of the blade table 5a by converting the relative motion between the fiber-holding portion 8 and the lever 10 to the motion of the blade table 5a. The mechanism 14 has a blade table restricting portion 14b disposed between the blade table 5a and a tapered surface 14a formed on the underside of the tip of the fiber-holding portion 8, fitted in a hole formed in the tip of the lever 10 so as to be slidable in the Z direction, and displaced in the Z direction by the action of the tapered surface 14a while being moved in the Y direction by the lever 10 (not moved in the x direction, which is perpendicular to the paper surface).

In the cutting device shown in FIG. 1, when the lever 10 is pulled in a state in which an optical fiber is not set as shown in FIG. 2 or in a state in which clamping of the wire by the fiber-holding portion 8 is insufficient, the fiber-holding portion 8, which is not subjected to any stopping force, will follow the movement of the lever 10. Thus, no relative movement occurs therebetween, so that positional relation between the tapered surface 14a and the blade table-restricting portion 14b remains unchanged. Thus, the blade table 5a will not move.

On the other hand, when the lever 10 is pulled with an optical fiber A on which is fitted a ferrule f set as shown in FIG. 3 and a wire W securely gripped by the chuck 7, since the fiber-holding portion 8 is held back by the optical fiber, only the lever 10 will move in the Y direction. Thus, the tension spring 9 is compressed and tension determined by the force of the spring 9, i.e. tension determined by the amount of relative movement between the fiber-holding portion 8 and the lever 10 is applied to the wire W.

At this time, due to relative movement between the fiber-holding portion 8 and the lever 10, the restricting point by the tapered surface 14a is displaced in the Z direction, so that the blade tables 5a moves up in the Z direction together with the blade table restricting portion 14b. The flaw forming blade 5b thus cuts into the wire W.

The moving amount of the blade table 5a relative to the amount of relative movement between the fiber-holding portion 8 and the lever 10 is determined by the inclination angle of the tapered surface 14a in the first embodiment. Thus, by suitably setting this angle so that the cutting blade 5b will abut the wire at a suitable pressure with a suitable tension applied to the wire. Further, since the force stopping the fiber-holding portion 8 disappears when the wire is cut, the fiber-holding portion 8 will move in the Y direction under the force of the spring 9, so that amount of its movement relative to the lever 10 will decrease and the blade table 5a will be forcibly pushed back. Thus, no excessive movement of the flaw forming blade 5b, which can cause damage of the cut surface will occur after the optical fiber has been cut.

If gripping of the wire stabilizes after the lever 10 has been pulled halfway and then tension begins to act on the optical fiber, the fiber-holding portion 8 will follow the movement of the lever 10 until tension is applied, and after tension begins to act, relative movement between the fiber-holding portion 8 and the lever 10 occurs. In such a case, too, the relation between the magnitude of tension applied to the optical fiber and the amount of movement by the flaw forming blade 5b is substantially constant, and also the flaw forming blade will not reach the wire if tension is insufficient or setting is not good.

After cutting, the lever 10 will return to its original position under the force of the spring 12. At this time, since the fiber-holding portion 8 is pushed back together and the protrusion 7e abuts the body frame 2, thereby releasing the clamp of the wire by the chuck 7, the cut wire can be easily removed.

Figure 4:
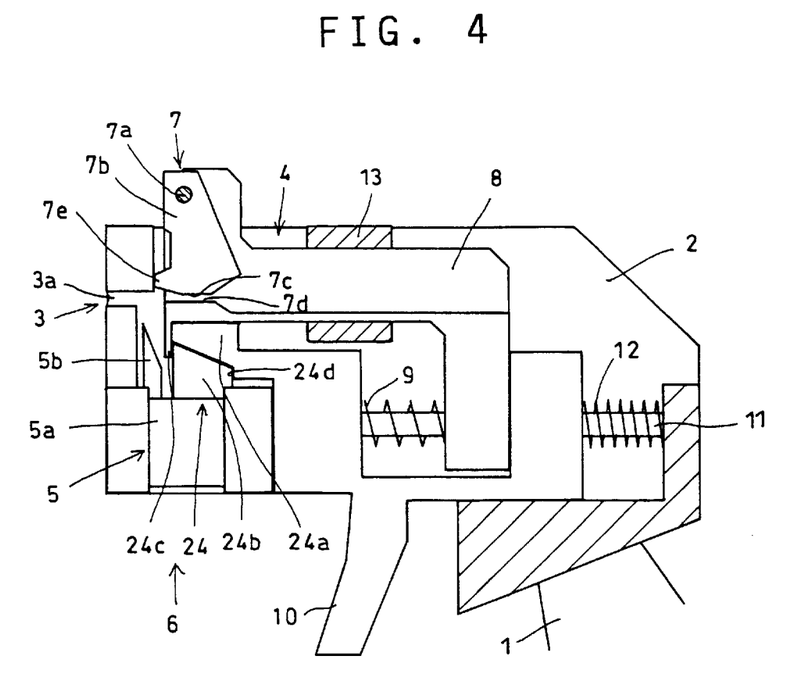
FIG. 4 is a sectional view showing a second embodiment.
Figure 5:
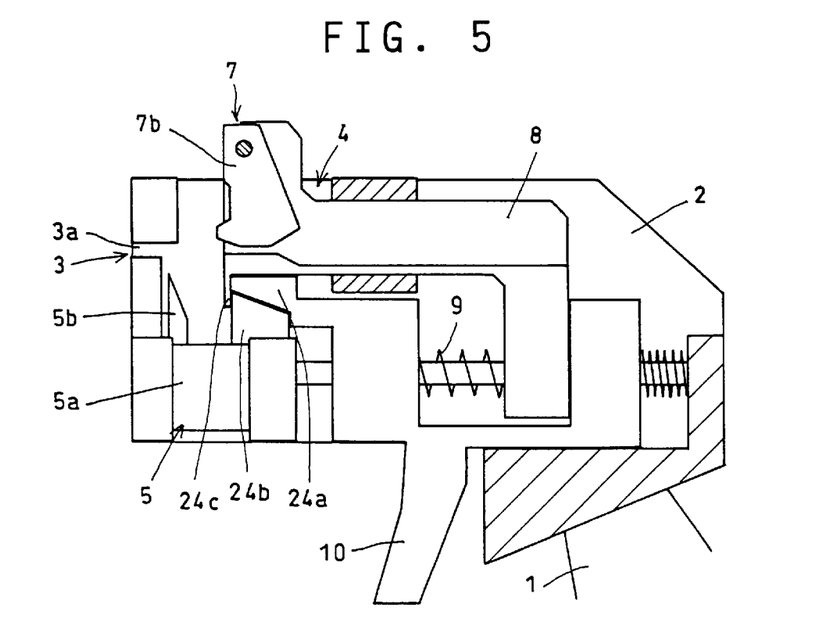
FIG. 5 is a view showing the operation of the device of FIG. 4 when an optical fiber is not set.
Figure 6:
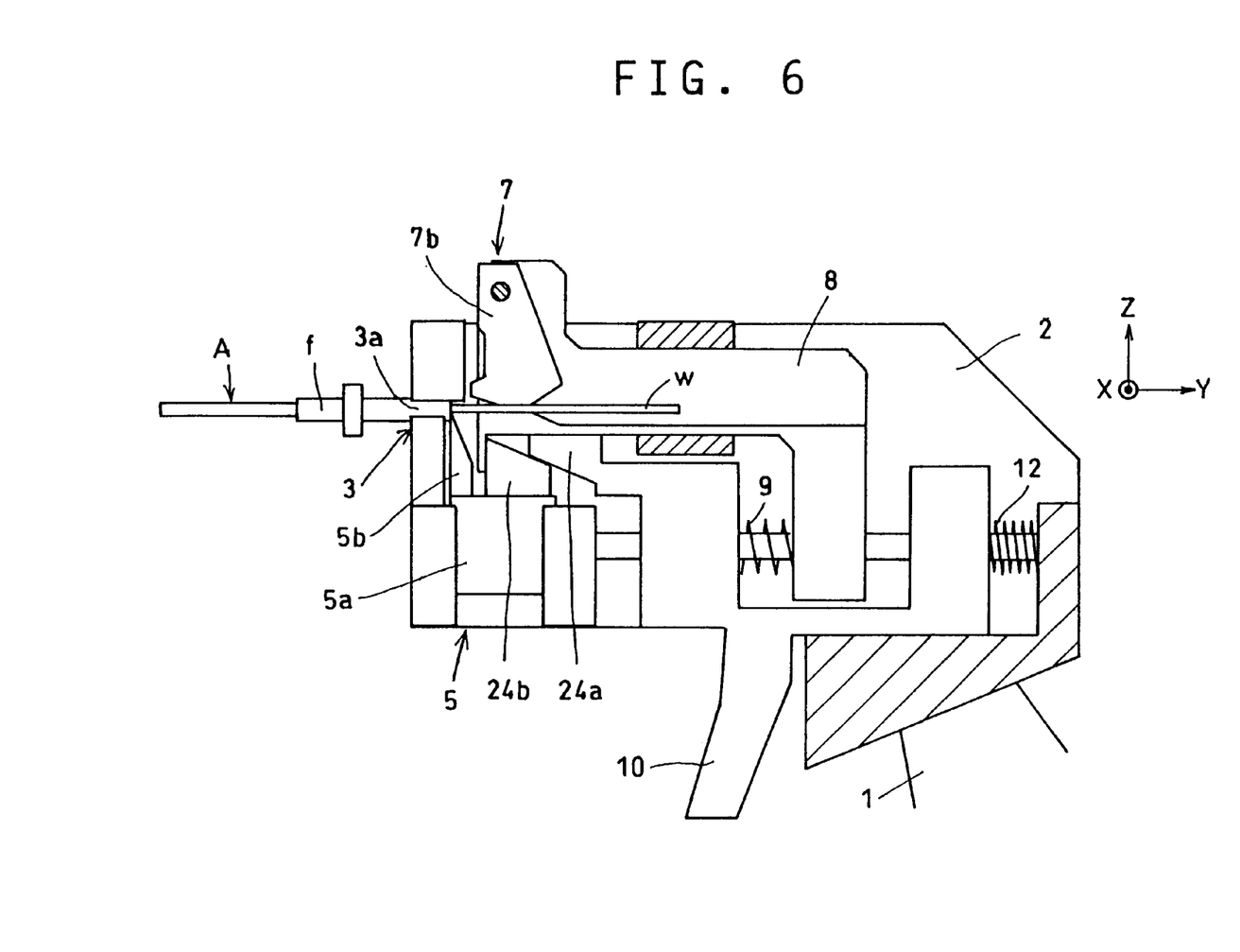
FIG. 6 is a view showing the operation of the same when it is set.
Figure 7:
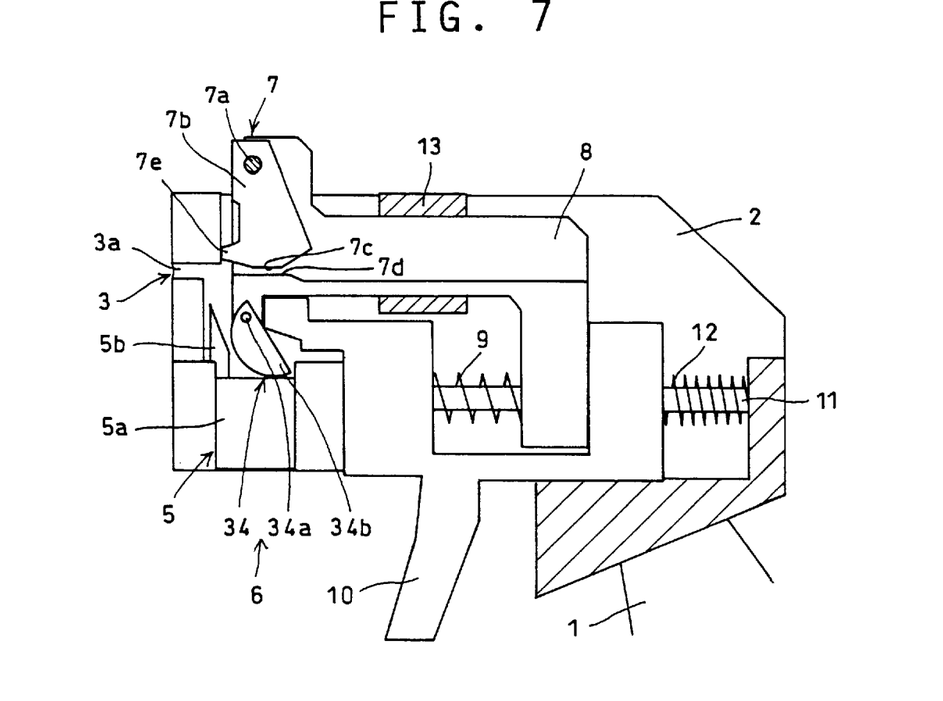
FIG. 7 is a sectional view showing a third embodiment.
Figure 8:
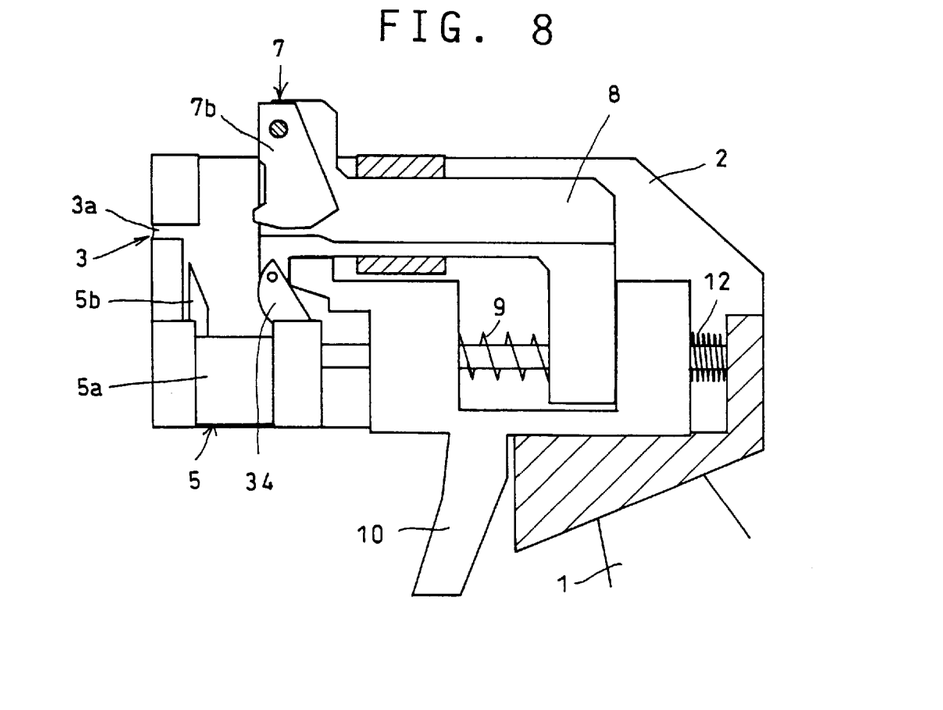
FIG. 8 is a view showing the operation of the device of FIG. 7 when an optical fiber is not set.
Figure 9:
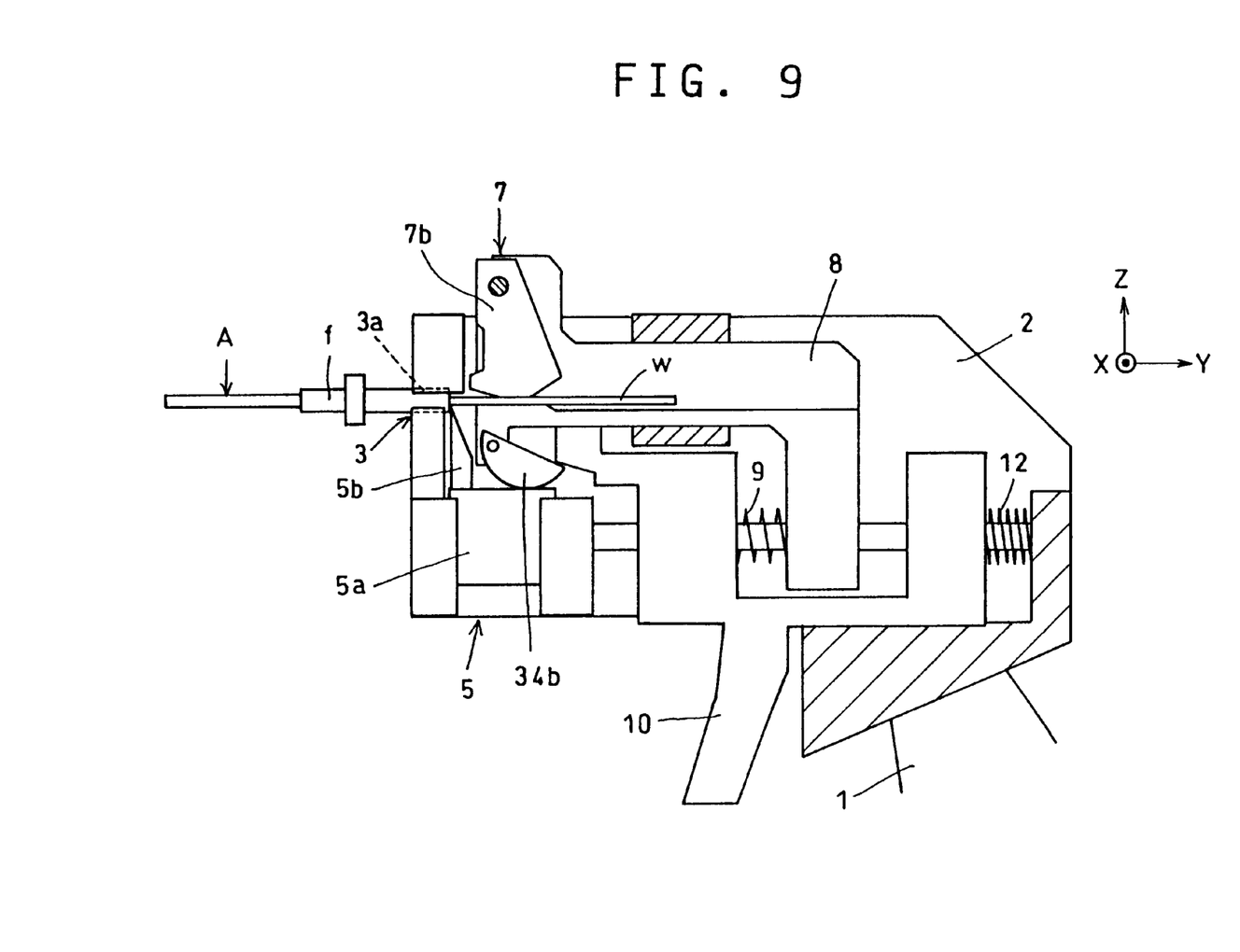
FIG. 9 is a view showing the operation of the same when it is set.
Figure 10:
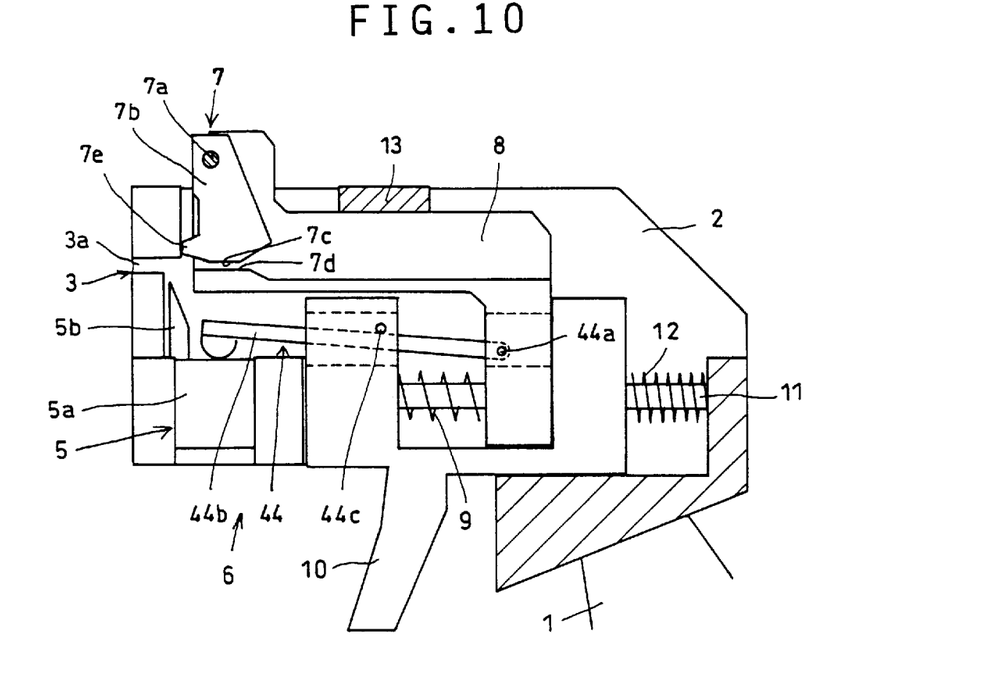
FIG. 10 is a sectional view showing a fourth embodiment.
Figure 11:
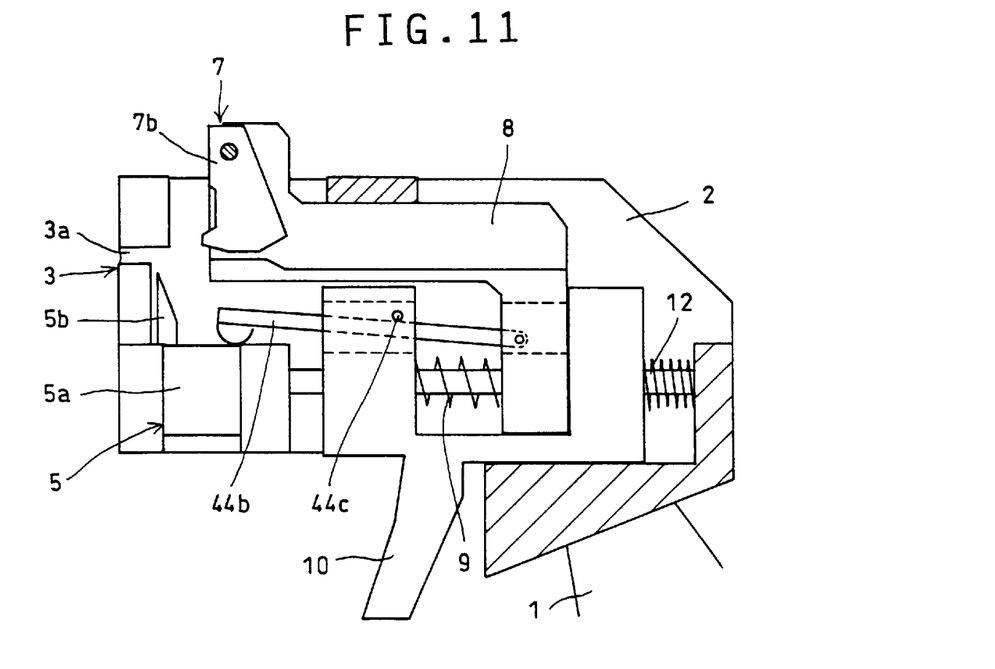
FIG. 11 is a view showing the operation of the device of FIG. 10 when an optical fiber is not set.
Figure 12:
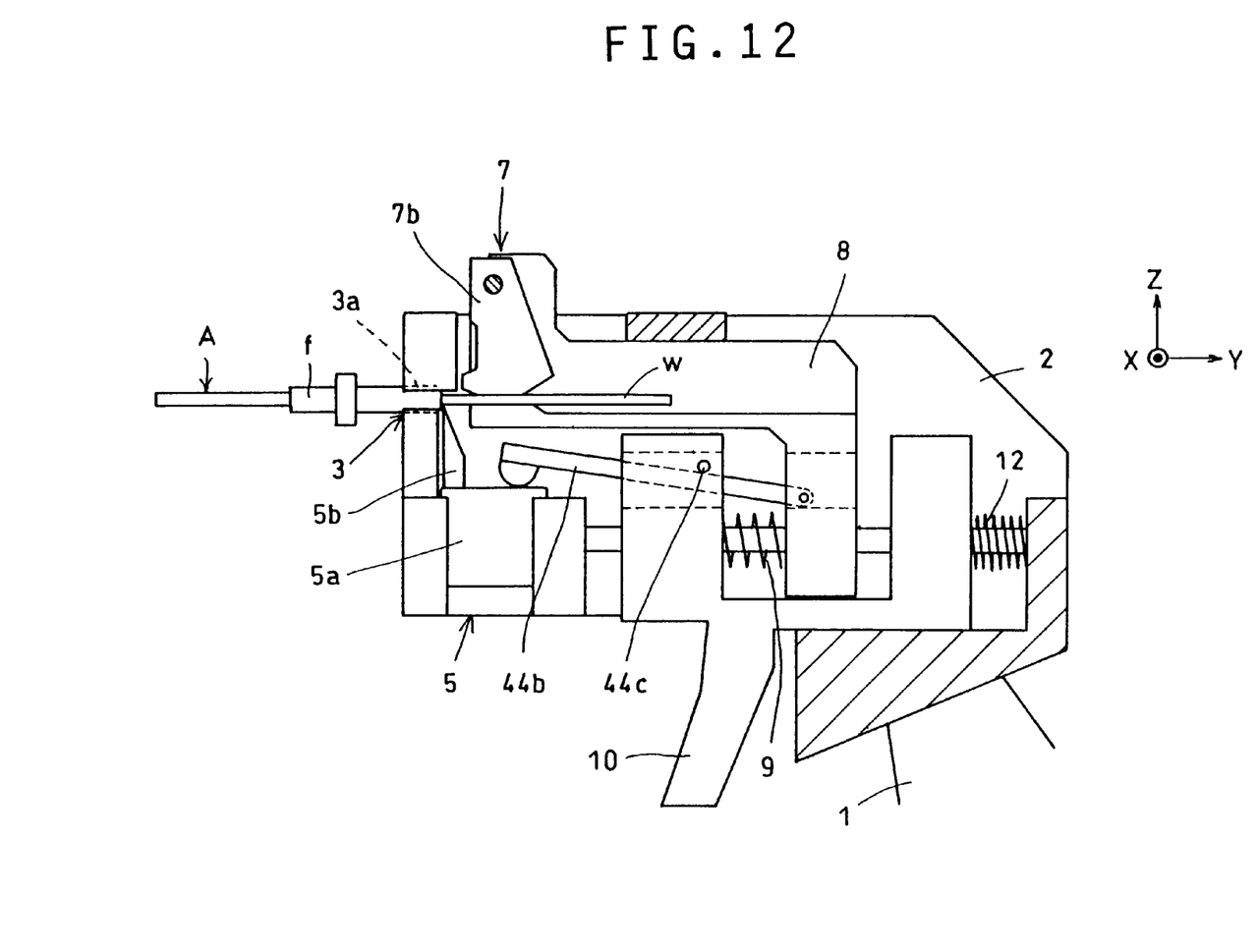
FIG. 12 is a view showing the operation of the same when it is set.

FIGS. 4–6 show the second embodiment, FIGS. 7–9 show the third embodiment, and FIGS. 10–12 show the fourth embodiment. With these cutting devices, the motion-converting mechanism for position control of the blade table 5a differs from that of the first embodiment of FIG. 1. Since other structures are the same as the embodiment of FIG. 1. The same numerals are attached to the same portions and description is omitted.

The motion-converting mechanism 24 used in the cutting device of FIG. 4 has a wedge portion 24a formed at the tip of the lever 10 and inserted between the bottom surface of the fiber-holding portion 8 and the blade table-restricting portion 24b. At the tip of the fiber-holding portion 8, a guide 24c for guiding the blade table-restricting portion 24b in the Z direction and pulling it in the Y direction is provided. On the lever 10, a surface 24d for pushing back the blade table-restricting portion 24b which has moved in the Y direction is provided.

With the cutting device of FIG. 4 provided with such a motion-converting mechanism 24, too, when the lever 10 is pulled without setting an optical fiber, the fiber-holding portion 8 and the blade table-restricting portion 24b will follow, so that no relative movement will occur between the lever 10 and them. Thus, the blade table 5a remains in the initial position (FIG. 5).

When the lever 10 is pulled with an optical fiber A correctly set, the fiber-holding portion 8 will be held back by the optical fiber, so that only the lever 10 will move. Thus, the wedge portion 24a will come out of the inserted position, so that due to displacement of the restricting point by the wedge portion 24a, the blade table 5a will move in the Z direction while pushing the blade table-restricting portion 24b (FIG. 6). Further, when the cutting blade 5b abuts the wire W and the latter is flawed, the fiber-holding portion 8 will move in such a direction as to reduce the moving distance relative to the lever under the force of the tension spring 9 together with the blade table-restricting portion 24b. Thus, the flaw forming blade 5b will move away from the optical fiber.

With the cutting devices of FIGS. 1 and 4, the moving amount of the blade table 5a is proportional to the amount of relative movement between the fiber-holding portion 8 and the lever 10. But this is not an essential requirement. It is only required that the blade table (or the flaw forming blade) reaches the target point when the amount of relative movement reaches the target value.

The motion-converting mechanism 34 in the cutting device of FIG. 7 uses a semicircular cam pivotally mounted at the tip of the fiber-holding portion 8 by a support shaft 34a as the blade table-restricting portion 34b. It is structured such that the blade table-restricting portion 34b, which tends to turn with the support shaft 34a as a fulcrum under the pushup force for the blade table 5a, is prevented from turning by the tip of the lever 10. When the lever 10 and the fiber-holding portion 8 move together without relative movement, the blade table-restricting portion 34b will follow without turning, so that the blade table 5a remains in the initial position (FIG. 8).

When the lever 10 is pulled with tension acting on the optical fiber A, the restricting point by the lever is displaced and the blade table-restricting portion 34b, which is pushed by the blade table 5a, will turn counterclockwise, so that the flaw forming blade 5b advances together with the blade table 5a and cuts into the wire W (FIG. 9).

The motion-converting mechanism 44 used in the cutting device of FIG. 10 has a blade table-restricting portion 44b in the form of a bar mounted on the fiber-holding portion 8 so as to be rotatable about a shaft 44a and press a bulging portion on the bottom of the tip of the blade table-restricting portion 44b against the top surface of the blade table 5a. A stopper pin 44c mounted on the lever 10 stops the rising of the blade table-restricting portion 44b due to rotation. When the fiber-holding portion 8 and the lever 10 move together without relative movement, the blade table-restricting portion 44b will not turn with the support shaft 44a as a fulcrum, so that the blade table 5a is maintained in its initial position (FIG. 11).

When the lever 10 is pulled with tension acting on the optical fiber A set, due to displacement of the stopper pin 44c, the blade table-restricting portion 44b is pushed up to a position restricted by the stopper pin 44c which has been displaced, so that the tip of the restricting portion is raised. Thus, the cutting blade 5b moves together with the blade table 5a and cuts into the wire W (FIG. 12).

The cutting device of each of the above embodiments are adapted such that tension applied to the optical fiber is determined by the amount of relative movement between the fiber-holding portion 8 and the lever 10. When relative movement occurs, the blade table moves in association with the movement of the lever by an amount corresponding to the amount of relative movement. Thus, with only a simple mechanical mechanism, it is possible to form a suitable flaw when a suitable tension is applied to the optical fiber. This eliminates all the disadvantages of conventional devices.

The objects to be cut by the cutting device of this invention are not limited to glass-cored optical fibers. The device of this invention can be effectively used for all the optical fibers which can be cut on the principle of stress rupture.

As described above, since the optical fiber cutting device of this invention is adapted such that the cutting position of the flaw forming blade is controlled according to tension applied to the optical fiber, it is possible to prevent unnecessarily large loads from being applied to the cutting edge and the flaw forming blade from cutting into a moving optical fiber, thereby preventing unexpected failure. Thus, it can maintain a stable performance for a long time.

Since no excessive move of the flaw forming blade occurs, the cut surface of the wire will not be damaged by the blade.

With the devices of the embodiments, since the flaw forming blade is pushed back simultaneously with the cutting, it is possible to more reliably prevent damage to the cut end face of the wire by the flaw forming blade. Also, since it is constructed only by mechanical mechanisms, it is possible to provide a simple, small, inexpensive and reliable device.

What is claimed is:

1. An optical fiber cutting device comprising a tension imparting mechanism for imparting tension to an optical fiber to be cut, a flaw forming mechanism for forming an initial flaw for stress rupture in the optical fiber to which is applied the tension, said flaw forming mechanism comprising a blade table and a flaw forming blade mounted on said blade table for forming the initial flaw in the optical fiber, and means for moving said flaw forming blade of said flaw forming mechanism in proportion to the magnitude of the tension applied to the optical fiber.

2. The optical fiber cutting device as claimed in claim 1 wherein said tension imparting means comprises a ferrule holding portion for holding a ferrule fitted on the optical fiber, a fiber-holding portion sildable in the longitudinal direction of the optical fiber for clamping a wire of the optical fiber protruding from the tip of said ferrule, a first resilient member for biasing said fiber-holding portion in a direction away from said ferrule-holding portion, and a lever coupled to said fiber-holding portion through said first resilient member so as to be movable relative to said fiber-holding portion, said means for moving said flaw forming blade comprising a motion-converting mechanism for converting the relative movement between said fiber-holding portion and said lever to the motion of said blade table according to the amount of said relative movement to control the position of said blade table.

3. The optical fiber cutting device as claimed in claim 2, further comprising a second resilient member for returning said lever so that the force of said second resilient member is transmitted to said fiber-holding portion through said lever.

4. The optical fiber cutting device as claimed in claim 2 wherein said blade table and said flaw forming blade of said flaw-forming mechanism are moved in the cutting direction by the force of a resilient member.

5. The optical fiber cutting device as claimed in claim 3 wherein said blade table and said flaw forming lade of said flaw-forming mechanism are moved in the cutting direction by the force of a resilient member.

* * * * *